(12) United States Patent
Zahn et al.

(10) Patent No.: US 11,650,806 B2
(45) Date of Patent: *May 16, 2023

(54) MULTIPLE VERSIONS OF ON-PREMISES LEGACY APPLICATION IN A MICROSERVICES ENVIRONMENT

(71) Applicant: SAP SE, Walldorf (DE)

(72) Inventors: Henning Zahn, Muehlenbeck (DE); Daniel Kirmse, Berlin (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,220

(22) Filed: May 25, 2022

(65) Prior Publication Data
US 2022/0317996 A1 Oct. 6, 2022

Related U.S. Application Data

(63) Continuation of application No. 17/222,728, filed on Apr. 5, 2021, now Pat. No. 11,422,790.

(51) Int. Cl.
*G06F 8/65* (2018.01)
*G06N 5/04* (2023.01)
*G06N 20/00* (2019.01)

(52) U.S. Cl.
CPC .............. *G06F 8/65* (2013.01); *G06N 5/04* (2013.01); *G06N 20/00* (2019.01)

(58) Field of Classification Search
CPC .................................................... G06F 8/65
See application file for complete search history.

(56) References Cited

U.S. PATENT DOCUMENTS

| | | | |
|---|---|---|---|
| 7,076,496 B1 * | 7/2006 | Ruizandrade | G06F 8/71 707/999.102 |
| 2009/0249324 A1 * | 10/2009 | Brar | G06F 9/455 717/173 |
| 2017/0230349 A1 | 8/2017 | Gaur et al. | |
| 2018/0081726 A1 * | 3/2018 | Ginis | G06F 11/3414 |
| 2018/0088925 A1 * | 3/2018 | Emeis | G06T 11/206 |
| 2018/0322437 A1 | 11/2018 | Mcclory et al. | |

OTHER PUBLICATIONS

"U.S. Appl. No. 17/222,728, Notice of Allowance dated Apr. 20, 2022", 11 pgs.

* cited by examiner

*Primary Examiner* — Jae U Jeon
(74) *Attorney, Agent, or Firm* — Schwegman Lundberg & Woessner, P.A.

(57) ABSTRACT

A data structure called a product version map is introduced. The product version map contains a catalog of available application versions to be used by the application orchestration services. It can describe the available versions. For each version, there is an image, such as a Docker® container image, that can be used to instantiate the application instance. Furthermore, in some example embodiments, an expiration date can be given, which could be used to enforce upgrades of application instances when their used version expires.

20 Claims, 7 Drawing Sheets

MULTIPLE VERSIONS OF ON-PREMISES LEGACY APPLICATION IN A MICROSERVICES ENVIRONMENT

CROSS-REFERENCE TO RELATED APPLICATIONS

This application is a continuation of prior U.S. application Ser. No. 17/222,728, filed on Apr. 5, 2021, which is incorporated by reference herein in its entirety.

TECHNICAL FIELD

This document generally relates to microservice software environments. More specifically, this document relates to supporting multiple versions of an on-premises legacy application in a microservices environment.

BACKGROUND

Microservices are small, independent software processes that can be written in multiple languages. An infrastructure designed for these modular components is known as a microservices environment or microservices architecture. Cloud environments may be used to implement microservices environments. An example of a microservices environment is SAP Cloud Platform® Extension Manager, from SAP SE of Walldorf, Germany.

On-premises applications are software components that are installed and run on the premises of the person or organization using the software, rather than at a remote facility such as a server farm or cloud. As more and more on-premises applications migrate to the cloud, however, there is difficulty in integrating these on-premises applications with the cloud-native microservices in a microservices environment. The cloud-native delivery model and the on-premises delivery model collide.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
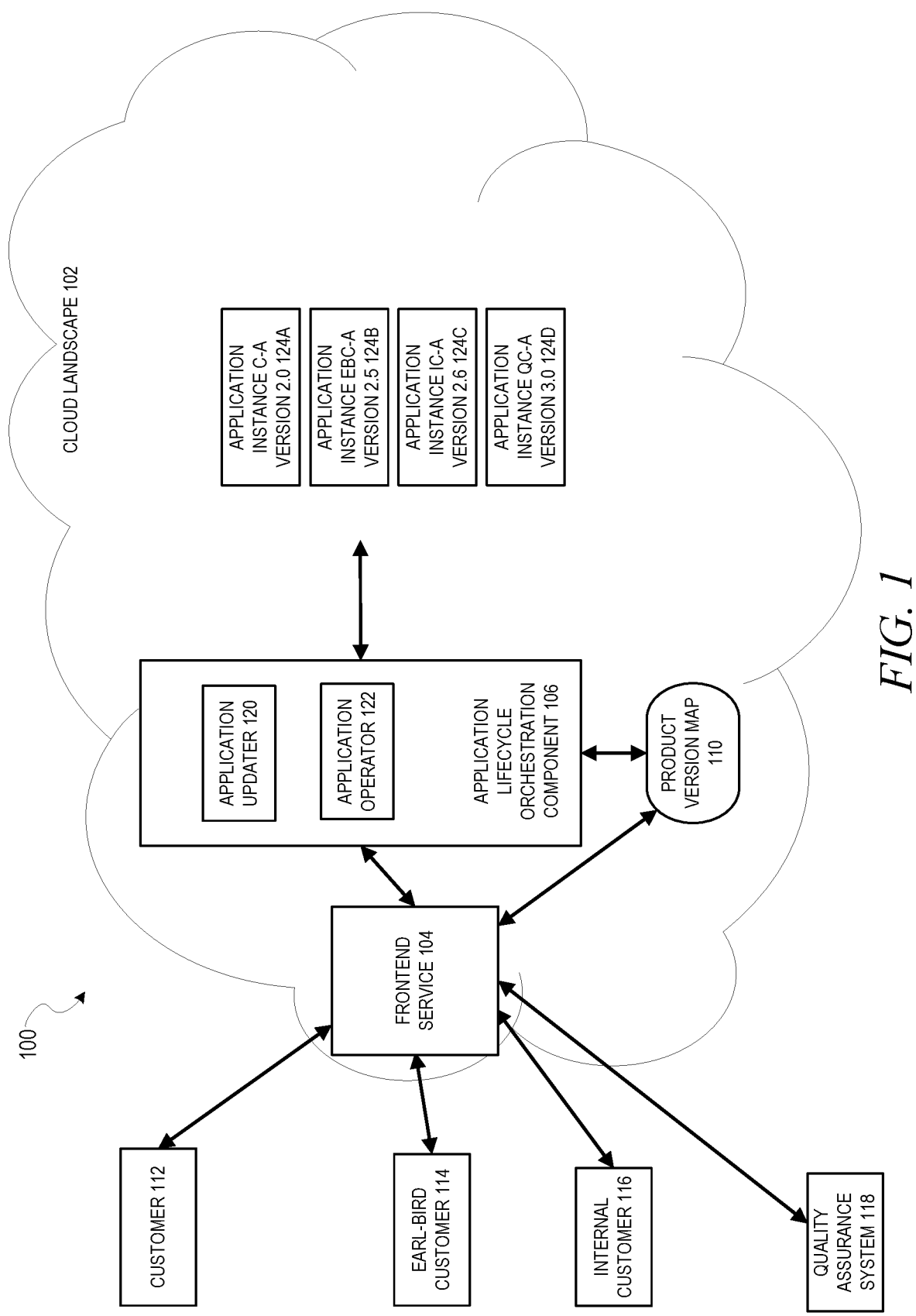
FIG. 1 is a diagram illustrating a microservices architecture in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

While cloud-native microservices are updated very frequently and an update that goes wrong can be rolled back easily, an on-premises application gets updated rarely and roll-backs are dangerous or even impossible. Nevertheless, the on-premises application needs to get updated more often when implemented in a microservices environment, to reduce the impact a bug in the application has on support and operations, as well as reputation, given that a bug will potentially impact many customers in parallel. The earlier a fix can be implemented, the fewer issues will be reported.

The quality of on-premises applications is usually ensured in a highly governed, expensive and long-running procedure. Adding tests in the cloud environment, on top of the classic tests run for on-premises installations, only prolongs the procedure and slows down updates. This entire process needs to be sped up in order to roll out updates more often, while still maintaining the confidence that the software product is in satisfactory shape to be rolled out. Because of that, the upcoming versions of the software application may need to be available for testing in the cloud context early in the development process.

In order to ensure a productive cloud setup, it would be beneficial to use the same mechanisms to activate a production-like application instance, even in productive landscapes. In order to accomplish this, it would be beneficial to create application instances from multiple different available versions. Internal customers or pilot customers could receive "early bird" versions while others remain on more of a long-term-support trail.

A technical issue that arises, however, is that it can be difficult to make an application version available to orchestration microservices so that the maturity of the application versions is properly stated, that orchestration services do not need to be changed in order to support a new set of available application versions, that a new set of available application versions is provided in a way that is decoupled from the lifecycle of both the orchestration services as well as the already running application instances, and such that on-premises applications would not have to be rolled back, given the difficulty in doing so. Maturity in this context means the lifecycle stage of the application, such as which testing phases the application has completed.

In an example embodiment, a solution is provided by introducing a data structure called a product version map. The product version map contains a catalog of available application versions to be used by the application orchestration services. It can describe the available versions. For each version, there is an image, such as a Docker® container image, that can be used to instantiate the application instance. Furthermore, in some example embodiments, an expiration date can be given, which could be used to enforce upgrades of application instances, when their used version expires. Below is an example of a product version map in accordance with an example embodiment:

```
apiVersion: feature.hc.com/v1alpha1
kind: ProductVersion
metadata:
  name: hana
spec:
  enablement:
    rolloutstrategy: staged-hana-rollout
    versions:
      id: 4.00.000.00.38
      name: HANA Cloud Edition 2019.38
      alias: evaluation
      image: some.container.registry/com.sap.hana.dbaas/
         hana-xx:4.38.0
      id: 4.00.000.00.36
      name: HANA Cloud Edition 2019.36
      alias: early-adoption
      image: some.container.registry/com.sap.hana.dbaas/
         hana-x:4.36.0
      expiration-date: "2029-11-30"
      id: 4.00.000.00.32
      name: HANA Cloud Edition 2019.32
      alias: generally-available-quarterly
      image: some.container.registry/com.sap.hana.dbaas/
         hana-xx:4.32.0
      expiration-date: "2019-11-02"
      id: 4.00.000.00.34
      name: HANA Cloud Edition 2019.34
      alias: generally-available-biweekly
      image: some.container.registry/com.sap.hana.dbaas/
         hana-xx:4.34.0
      expiration-date: "2019-04-02"
      id: 4.00.000.00.26
      name: HANA Cloud Edition 2019.26
      alias: maintenance
      image: some.container.registry/com.sap.hana.dbaas/
         hana-xx:4.26.0
      expiration-date: "2019-09-21"
```

In an example embodiment, the product version map may be implemented in a Kubernetes® environment, or another container architecture, either as a ConfigMap or as a custom resource which is an instance of a custom resource definition. The above example is an example of a custom resource.

Kubernetes® is a system for automating deployment, scaling, and management of containerized applications. Application containerization is a virtualization method used by operating systems to deploy and run distributed applications without launching an entire virtual machine for each application.

Containerized applications have advantages over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

Containers organized by Kubernetes, by virtue of being so modular, are quite conducive to scaling of in-memory database instances. Containers organized by Kubernetes are called pods. Each pod is scheduled on a specific host. If the host becomes unavailable, Kubernetes automatically instantiates the containers of a pod on a different host, greatly easing maintenance.

FIG. 1 is a diagram illustrating a microservices architecture 100 in accordance with an example embodiment. A cloud landscape 102 includes a frontend service 104, an application lifecycle orchestration component 106, and a product version map 110. The frontend service 104 interacts with one or more customers, including customer 112, earlybird customer 114, internal customer 116, and quality assurance system 118. As will be described in more detail later, the frontend service 104 acts to provide one or more of these customers with the choice of multiple different application instances to roll out (activate for their usage).

The frontend service 104 also interfaces with the application lifecycle orchestration component 106, which contains an application updater 120 and an application operator 122. The application operator 122 creates application instances 124A, 124B, 124C, 124D, which runs them in different versions. The application updater 120 uses the product version map 110 to check for offer upgrades for the right maturity level of the respective application instance. The frontend service 104 may then use these upgrade offers to offer one or more of the customers 112, 114, 116, and 118 the ability to upgrade to a later version of the application instance based on their respective maturity level. Thus, for example, customer 112 runs an application instance of a version that is at a fairly high maturity level (e.g., it has been put through many different stages of testing to ensure stability), while quality assurance system 118 runs an application instance of a version that is at a fairly low maturity level (e.g., it is still in the early stages of testing), then a particular newer instance of the version that has a maturity level somewhere in the middle may be made available to the quality assurance system 118 but not the customer 112, since the customer 112 will likely not want to roll out a version of the software that is not as well tested as the version they are currently running, even if it is a newer version than the one that they are currently running.

Application operator 122 may further, in some example embodiments, offer additional choices of application instance versions for a user to roll out, including, for example, versions at lower maturity levels or on different update schedules.

The product version map 110 contains a list of available product versions and their classifications. Provisioning of new application instances uses this product version map 110 to offer the maturity options to the user. Application lifecycle orchestration component 106 retrieves the low-level information needed to create application instances, such as parameters needed to provision memory or other system resources.

The product version map 110 enables the frontend service 104 to provide application versions to choose from depending on the customer's contract (e.g., subscription level), let the customer choose between a subset of application versions available for external customers, and provide a complete list of application versions. The customer can then provision the application version that they have selected.

Figure 2:
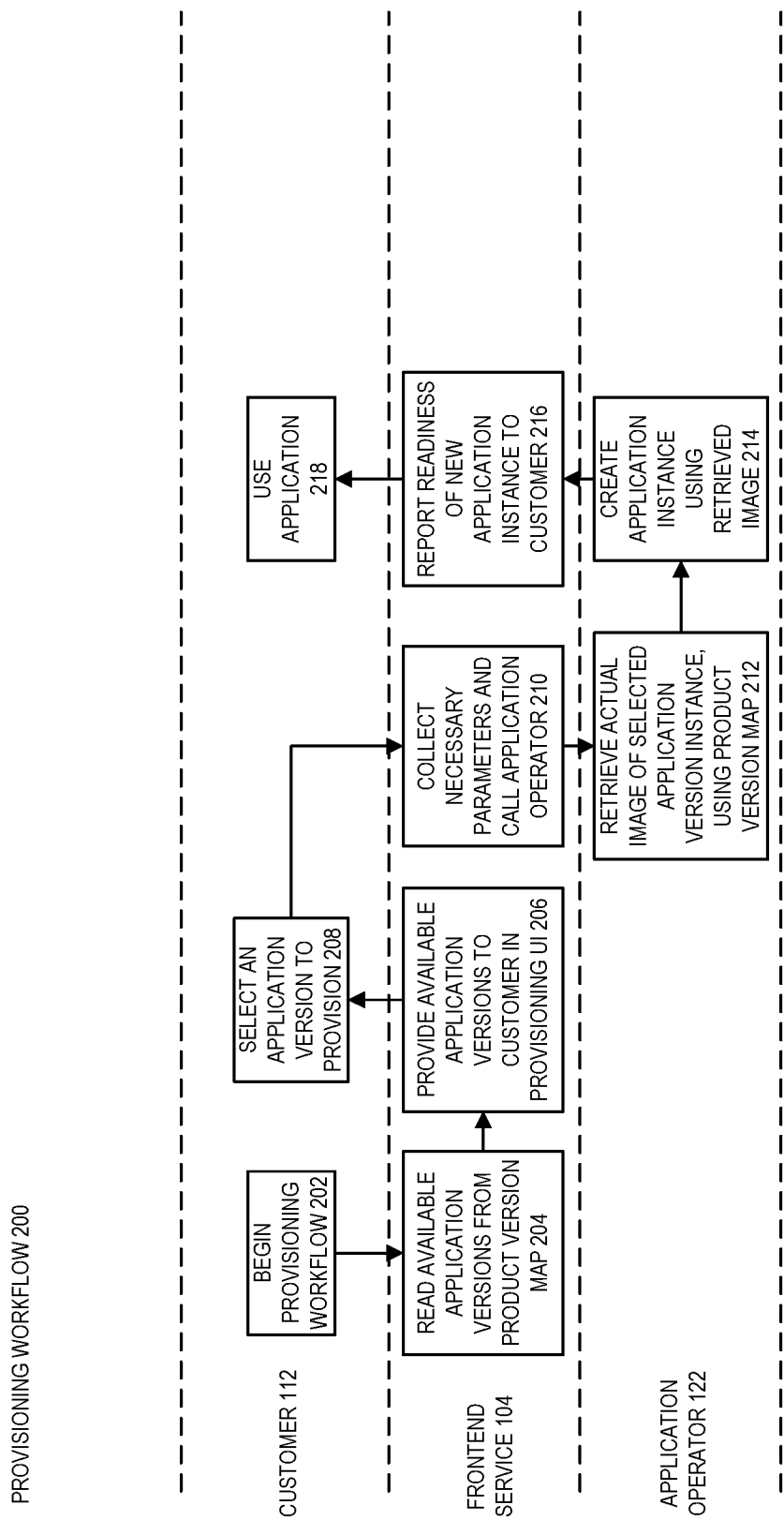
FIG. 2 is a workflow diagram illustrating a method of provisioning an application instance version in accordance with an example embodiment.

FIG. 2 is a workflow diagram illustrating a method 200 of provisioning an application instance in accordance with an example embodiment. At operation 202, a customer 112 begins a provisioning workflow. This may include, for example, making an appropriate selection of a version to begin application instance provisioning in a user interface provided by the frontend service 104. At operation 204, the frontend service 104 reads available application versions from the product version map 110. At operation 206, the frontend service 104 provides available application versions to the customer 112 in a provisioning user interface.

At operation 208, the customer 112 picks an application version from the available application versions to provision. In response, at operation 210, the frontend service 104 collects necessary parameters and calls the application operator 122. These parameters may include any parameters needed to provision the corresponding application instance, and may vary depending on the type of application being provisioned. For example, in the case of the application being an instance of an in-memory database, the parameters may include how much memory and CPUs to allocate to the in-memory database.

At operation 212, the application operator 122 retrieves the actual Docker® image of the selected application version using the information from the product version map 110, which may include a location of or link to the image. At operation 214, the application operator 122 creates an application image using the retrieved Docker® image.

At operation 216, the frontend service 104 reports readiness of the new application instance to the customer 112. At operation 218 the customer 112 may then use the application.

Figure 3:
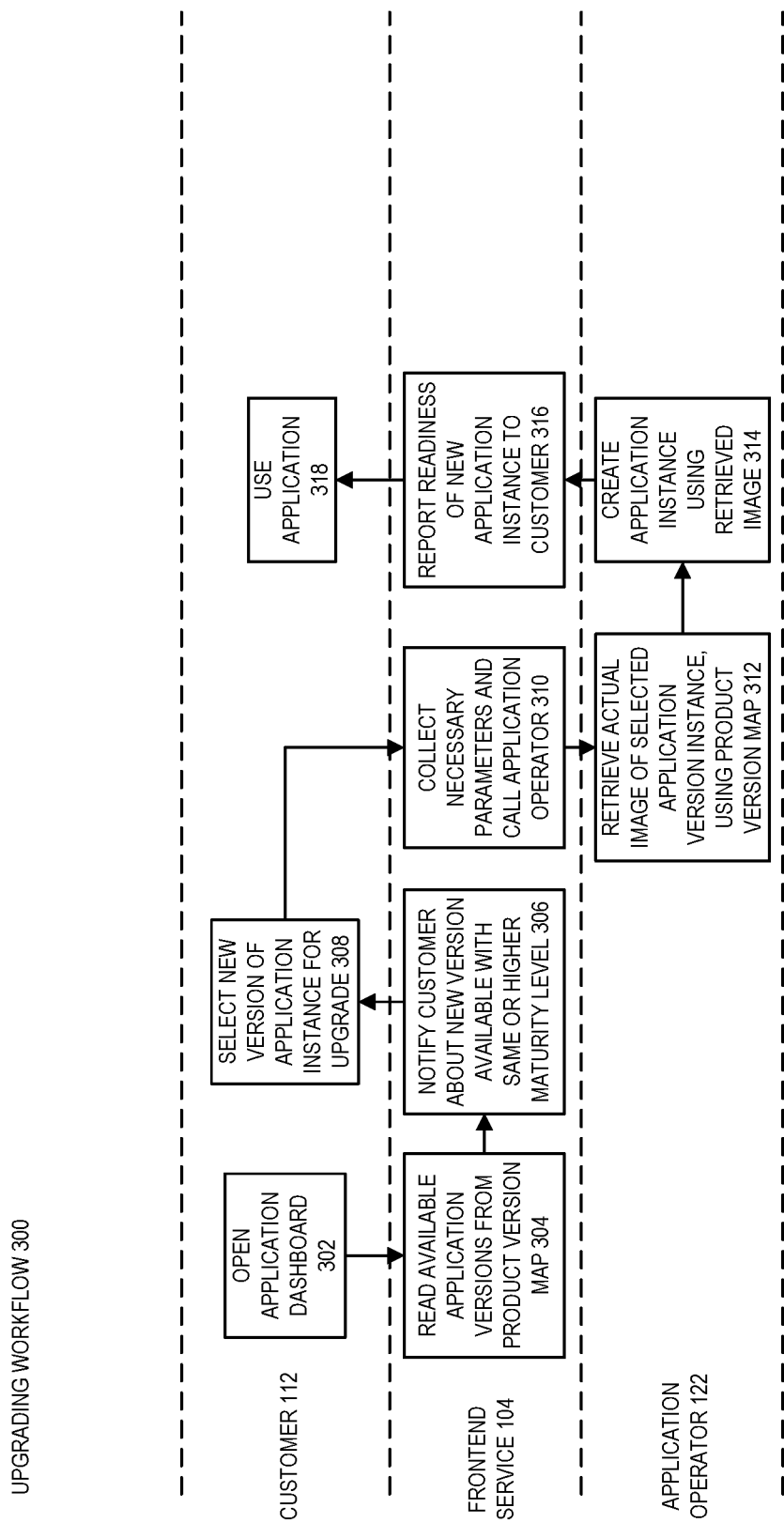
FIG. 3 is workflow diagram illustrating a method of upgrading an application instance in accordance with an example embodiment.

At some point, it may become useful for a user to upgrade their current application instance to a newer version. FIG. 3 is workflow diagram illustrating a method 300 of upgrading an application instance in accordance with an example embodiment. Depending upon implementation, there are a few different options that could be provided in this context. The first would be to display to the user only upgraded versions that are at the same maturity level (or higher) as the customer's application instance, and thus the user is able to select an upgraded version without risk of accidentally selecting a newer version that has a lower maturity level than they are accustomed to. The second would be to display to the user all available application instance versions, even those with a lower maturity level than their existing application instance. It should be noted that in this implementation it is still beneficial to display the maturity level next to each application instance version choice, to provide the customer with the most information to make their selection. The third would be a hybrid of these two, offering a selection to upgrade while maintaining the same or higher maturity level using an easy user interface element (such as an "upgrade now" button), but allowing for a user interface element or elements that allow the user to select an application instance having a lower maturity level should they so choose.

At operation 302, the customer 112 opens an application dashboard, which is a user interface that permits a user to upgrade the application instance version. At operation 304, the frontend service 104 reads available application versions from the product version map 110. At operation 306, the frontend service 104 notifies the customer 112 about a new version available with the same or higher maturity level of as the customer's existing application instance version. This may be presented in the form of a user interface displayed to the customer 112. Here is where the optional implementations described in the previous paragraph could be used to display additional application instance versions at lower maturity levels for selection as well. Regardless of the implementation, at operation 308, the customer 112 selects a new version of the application instance for upgrade.

In response, at operation 310, the frontend service 104 collects necessary parameters and calls the application operator 122. These parameters may include any parameters needed to provision the corresponding application instance, and may vary depending on the type of application being provisioned. For example, in the case of the application being an instance of an in-memory database, the parameters may include how much memory and CPUs to allocate to the in-memory database.

At operation 312, the application operator 122 retrieves the actual Docker® image of the selected application version, using the information from the product version map 110, which may include a location of or link to the image. At operation 314, the application operator 122 creates an application image using the retrieved Docker® image.

At operation 316, the frontend service 104 reports readiness of the new application instance (the upgrade) to the customer 112. At operation 318, the customer 112 may then use the application.

Figure 4:
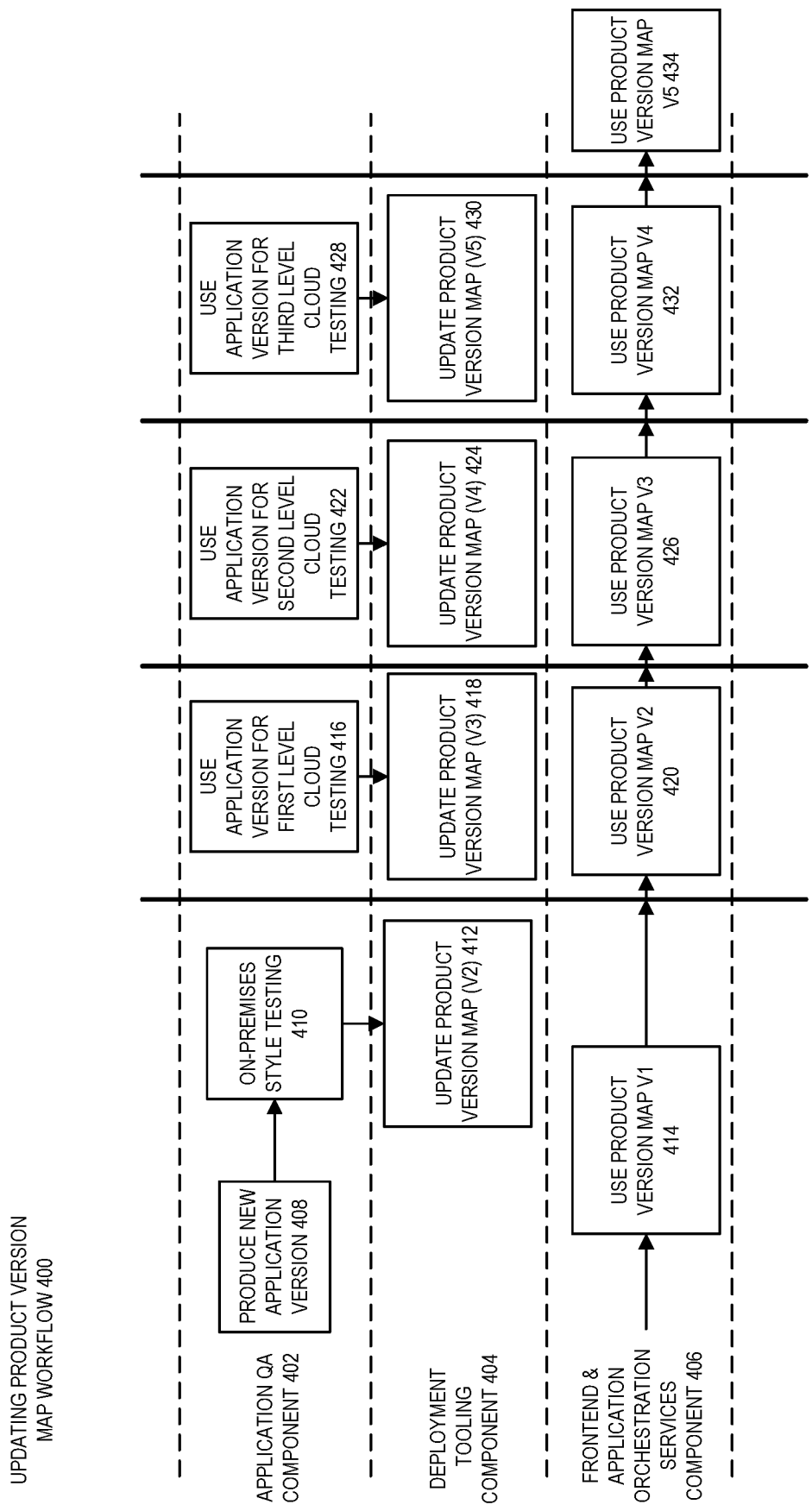
FIG. 4 is a workflow illustrating a method of updating a product version map in accordance with an example embodiment.

As application versions are created during production, the product version map may be updated. FIG. 4 is a workflow illustrating a method 400 updating of a product version map in accordance with an example embodiment. Here, production involves three entities: an application quality assurance (QA) component 402, a deployment tooling component 404, and a frontend & application orchestration services component 406.

At operation 408, the application QA component 402 produces a new application version. At operation 410, the application QA component 402 performs "on-premises" style testing on the new application version. At operation 412, the deployment tooling component 404 updates the product version map with the new application version and the indication of the maturity level (e.g., "QA" indicating on-premises style testing only). Prior to this update, at operation 414, the frontend & application orchestration services component 406 uses version 1 of the product version map, and operation 412 updates the product version map to version 2. Thus, at operation 420, the frontend & application orchestration services component 406 uses version 2 of the product version map. During this time, at operation 416, the application QA component 402 uses the application version created earlier for testing in the cloud environment. This changes the maturity level of this application version to a higher level of maturity, such as one labeled "IC" to indicate early integration such as both on-premises style testing and a first level of testing in the cloud. At operation 418, the deployment tooling component 404 updates the product version map with this new indication of maturity level, thus changing the version of the product version map to version 3.

At operation 426, the frontend & application orchestration services component 406 begins using version 3 of the product version map. During this time, at operation 422, the application QA component 402 uses the application version created earlier for additional testing in the cloud environment. This changes the maturity level of this application version to a higher level of maturity, such as one labeled "EBC" to indicate evaluation testing, such as completion of both on-premises style testing and two levels of testing in the cloud. At operation 424, the deployment tooling component 404 updates the product version map with this new indication of maturity level, thus changing the version of the product version map to version 4.

At operation 432, the frontend & application orchestration services component 406 begins using version 4 of the product version map. During this time, at operation 428, the application QA component 402 uses the application version created earlier for additional testing in the cloud environment. This changes the maturity level of this application version to a higher level of maturity, such as one labeled "C" to indicate bi-weekly release, such as completion of both on-premises style testing and three levels of testing in the cloud. At operation 430, the deployment tooling component 404 updates the product version map with this new indication of maturity level, thus changing the version of the product version map to version 5. Then, at operation 434, the frontend & application orchestration services component 406 begins using version 5 of the product version map.

The impact of an application version with bad quality could be disastrous in a cloud environment, where many customers could provision new application instances using that version in a very short timeframe, or where a force-upgrade could potentially upgrade many customers to a buggy version in a similarly short timeframe. In order to reduce this potential impact, the buggy version needs to be backed out quickly. The product version map supports this by deploying a new version of the product version map which no longer contains the buggy application version that has been backed out to the application orchestration services. Thus, if an application version contained in version 4 of the product version map, for example, is found to be buggy, it may be removed from the next version (version 5) of the product version map. Since all customers use the most recent version of the product version map, this permits the system to prevent provisioning a buggy application instance once it is found to be buggy. Customers who have already provisioned or upgraded to the buggy application version prior to the problems being discovered will still need to have their systems fixed, but at least other customers will be prevented immediately from implementing the buggy version. The aforementioned maturity level determinations help customers manage the risk of such situations occurring—customers who wish to utilize application versions that have not been fully tested may do so, but risk having to undo changes caused by a buggy version. Some customers may be more accepting of such risks than others, and some implementations, as described earlier, even prevent customers from being able to select, or at least being able to easily select, application versions with a maturity level that is lower than the application instance version they are already running.

In an example embodiment, there may be five different potential maturity levels of an application version. The first, called "QA", may be nightly builds for end-to-end testing. The second, called "Early Integration," may be successfully QA qualified, and have inbound testing by internal applications. The third, called "Evaluation," may have had successful early integration, and additionally been tested in regular development systems or even systems of consuming applications. The fourth, called "bi-weekly release," may have had successful evaluation, and additionally been used in systems of consuming applications and be externally available for customers, with no patches. The fifth, called "quarterly release," may have had successful evaluation and have been used in systems of consuming applications, been externally available for customers, but have patches available.

Further, in an example embodiment, a machine learning algorithm may be used to train a machine learning model to perform automatic rollback of product version map changes. For example, when a database version proves to be buggy, the machine learned model could detect this automatically and rollback to the last known good operating version could be triggered automatically. The machine learned model is trained to learn patterns in metric data to identify buggy versions even before bugs become obvious, such as spotting tendencies towards memory leaks.

The machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

The training data may include metrics gathered about prior application versions (from the application being evaluated, or from another application of the same type—e.g., another database application). The metrics may include, for example, memory leakage metrics. Some of the metrics may be transformed prior to being used as training data, such as by reformatting the metrics, or even calculating new metrics based on provided measurements or metrics. The machine learning algorithm then is applied to the training data to learn values for one or more weights to be applied to input features of an application version being evaluated for bugginess, by applying the machine learning algorithm over and over again, modifying the weights in each iteration, until a specified loss function is satisfied.

An application version may then be evaluated for bugginess by feeding one or more features, such as metrics, about the version to the machine learned model, which apply the weights (such as by multiplication) to the feature values to obtain a score for the application version being evaluated. This score may then be compared against a threshold to determine whether the conclusion of the machine learned model is that the application version is too buggy to be used and must be rolled back. If so, then the machine learned model may trigger the automatic rollback of the last product version map change.

Figure 5:
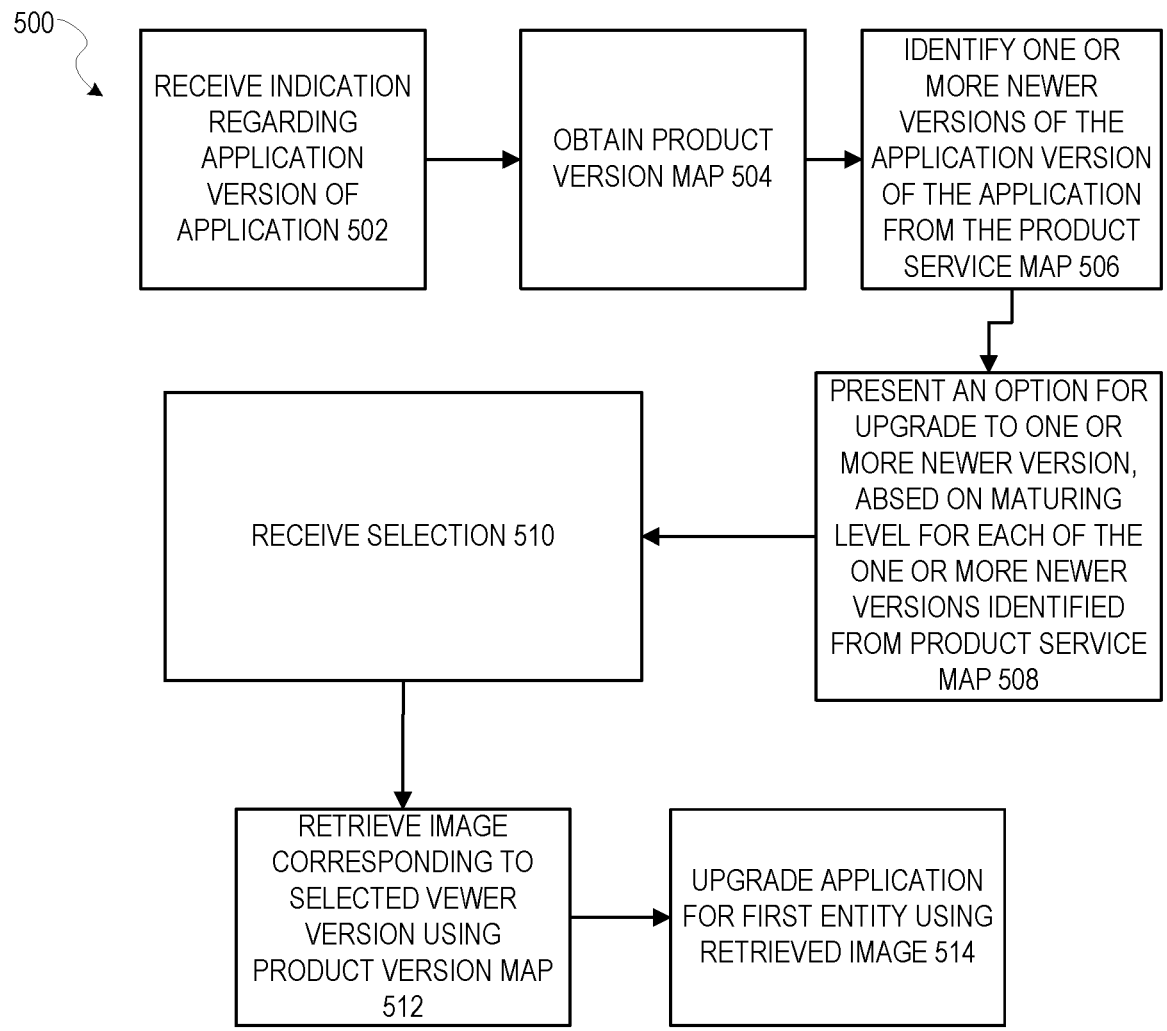
FIG. 5 is a flow diagram illustrating a method for upgrading a software application, in accordance with an example embodiment.

FIG. 5 is a flow diagram illustrating a method 500 for upgrading a software application, in accordance with an example embodiment. At operation 502, an indication regarding an application version of an application operated by a first entity in a microservices environment is received. At operation 504, a product version map stored in the microservices environment is obtained. The product version map includes, for each of one or more applications, a list of one or more application versions, available for provisioning by entities in the microservices environment in the microservices environment, and for each of the one or more application versions, an indication of a location for an image corresponding to the application version, and a maturity level for the application version, the maturity level indicating a level of testing performed on the application version. At operation 506, one or more newer versions of the application version of the application operated by the first entity are identified from the product service map. At operation 508, based on the maturity level for each of the one or more newer versions of the application version of the application operated by the first entity, an option for the entity to upgrade to one or more newer versions is presented via a user interface. At operation 510, a selection is received, via the user interface, of one of the one or more presented newer versions of the application version of the application operated by the first entity. At operation 512, an image corresponding to the selected newer version is retrieved using the product version map. At operation 514, an application instance for the first entity is upgraded using the retrieved image.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
receiving an indication regarding an application version of an application operated by a first entity in a microservices environment;
obtaining a product version map stored in the microservices environment, the product version map including, for each of one or more applications, a list of one or more application versions, available for provisioning by entities in the microservices environment and, for each of the one or more application versions, an indication of a location for an image corresponding to the application version;
identifying, from the product version map, one or more newer versions of the application version of the application operated by the first entity;
based on a maturity level for each of the one or more newer versions of the application version of the application operated by the first entity, presenting, in a user interface, an option for the entity to upgrade to one or more newer versions;
receiving a selection, via the user interface, of one of the one or more presented newer versions of the application version of the application operated by the first entity;
retrieving an image corresponding to the selected newer version using the product version map; and
upgrading an application instance for the first entity using the retrieved image.

Example 2. The system of Example 1, wherein the operations further comprise:
collecting provisioning parameters for the selected newer version; and
upgrading the application instance by provisioning the selected newer version using the provisioning parameters.

Example 3. The system of Examples 1 or 2, wherein the provisioning parameters include memory size.

Example 4. The system of any of Examples 1-3, wherein the presenting includes presenting only newer application versions of the application operated by the first entity that have a same or higher maturity level than a maturity level of the application version of the application operated by the first entity.

Example 5. The system of any of Examples 1-4, wherein the presenting includes presenting the maturity level of each newer application versions of the application operated by the first entity.

Example 6. The system of any of Examples 1-5, wherein the operations further comprise:
detecting that an application version associated with the retrieved image is unreliable; and
in response to the detecting, deleting the application version from the product version map.

Example 7. The system of Example 6, wherein the detecting is performed using a machine learned model trained by a machine learning algorithm using training data, to output a score indicative of reliability of an application version.

Example 8. The system of Example 1, wherein the maturity level indicates a level of testing performed on a corresponding application instance version.

Example 9. A method comprising:
receiving an indication regarding an application version of an application operated by a first entity in a microservices environment;
obtaining a product version map stored in the microservices environment, the product version map including, for each of one or more applications, a list of one or more application versions, available for provisioning by entities in the microservices environment and, for each of the one or more application versions, an indication of a location for an image corresponding to the application version;
identifying, from the product version map, one or more newer versions of the application version of the application operated by the first entity;
based on a maturity level for each of the one or more newer versions of the application version of the application operated by the first entity, presenting, in a user interface, an option for the entity to upgrade to one or more newer versions;
receiving a selection, via the user interface, of one of the one or more presented newer versions of the application version of the application operated by the first entity;
retrieving an image corresponding to the selected newer version using the product version map; and
upgrading an application instance for the first entity using the retrieved image.

Example 10. The method of Example 9, further comprising:
collecting provisioning parameters for the selected newer version; and
upgrading the application instance by provisioning the selected newer version using the provisioning parameters.

Example 11. The method of any of Examples 9-10, wherein the presenting includes presenting only newer application versions of the application operated by the first entity that have a same or higher maturity level than a maturity level of the application version of the application operated by the first entity.

Example 12. The method of any of Examples 9-11, wherein the presenting includes presenting the maturity level of each newer application versions of the application operated by the first entity.

Example 13. The method of any of Examples 9-12, further comprising:
detecting that an application version associated with the retrieved image is unreliable; and
in response to the detecting, deleting the application version from the product version map.

Example 14. The method of Example 13, wherein the detecting is performed using a machine learned model trained by a machine learning algorithm using training data, to output a score indicative of reliability of an application version.

Example 15. A non-transitory machine-readable medium storing instructions which, when executed by one or more processors, cause the one or more processors to perform operations comprising:
receiving an indication regarding an application version of an application operated by a first entity in a microservices environment;
obtaining a product version map stored in the microservices environment, the product version map including, for each of one or more applications, a list of one or more application versions, available for provisioning by entities in the microservices environment and, for each of the one or more application versions, an indication of a location for an image corresponding to the application version;

identifying, from the product version map, one or more newer versions of the application version of the application operated by the first entity;

based on a maturity level for each of the one or more newer versions of the application version of the application operated by the first entity, presenting, in a user interface, an option for the entity to upgrade to one or more newer versions;

receiving a selection, via the user interface, of one of the one or more presented newer versions of the application version of the application operated by the first entity;

retrieving an image corresponding to the selected newer version using the product version map; and upgrading an application instance for the first entity using the retrieved image.

Example 16. The non-transitory machine-readable medium of Example 15, wherein the operations further comprise:

collecting provisioning parameters for the selected newer version; and upgrading the application instance by provisioning the selected newer version using the provisioning parameters.

Example 17. The non-transitory machine-readable medium of Examples 15 or 16, wherein the provisioning parameters include memory size.

Example 18. The non-transitory machine-readable medium of any of Examples 15-17, wherein the presenting includes presenting only newer application versions of the application operated by the first entity that have a same or higher maturity level than a maturity level of the application version of the application operated by the first entity.

Example 19. The non-transitory machine-readable medium of any of Examples 15-18, wherein the presenting includes presenting the maturity level of each newer application versions of the application operated by the first entity.

Example 20. The non-transitory machine-readable medium of any of Examples 15-19, wherein the operations further comprise:

detecting that an application version associated with the retrieved image is unreliable; and in response to the detecting, deleting the application version from the product version map.

Figure 6:
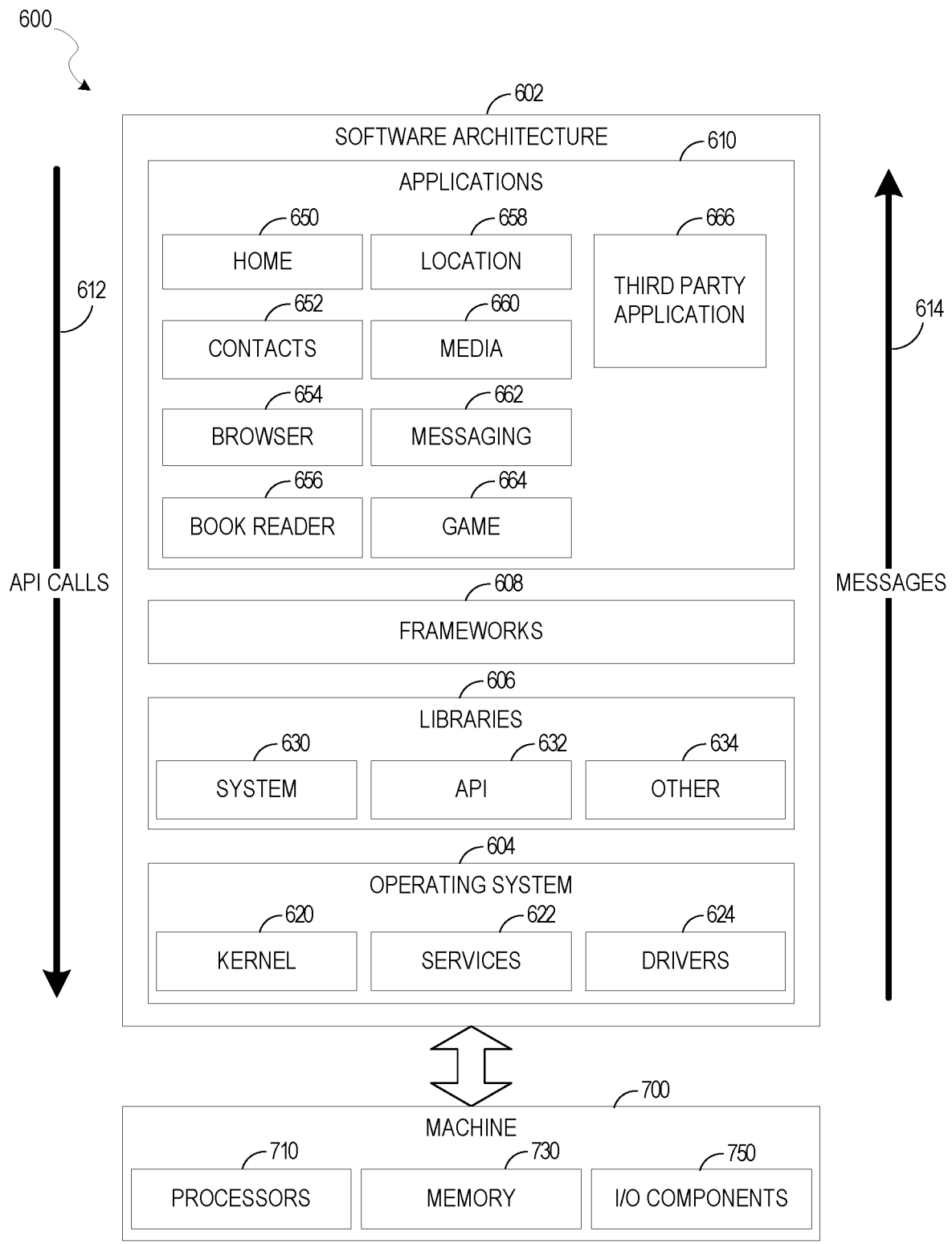
FIG. 6 is a block diagram illustrating an architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
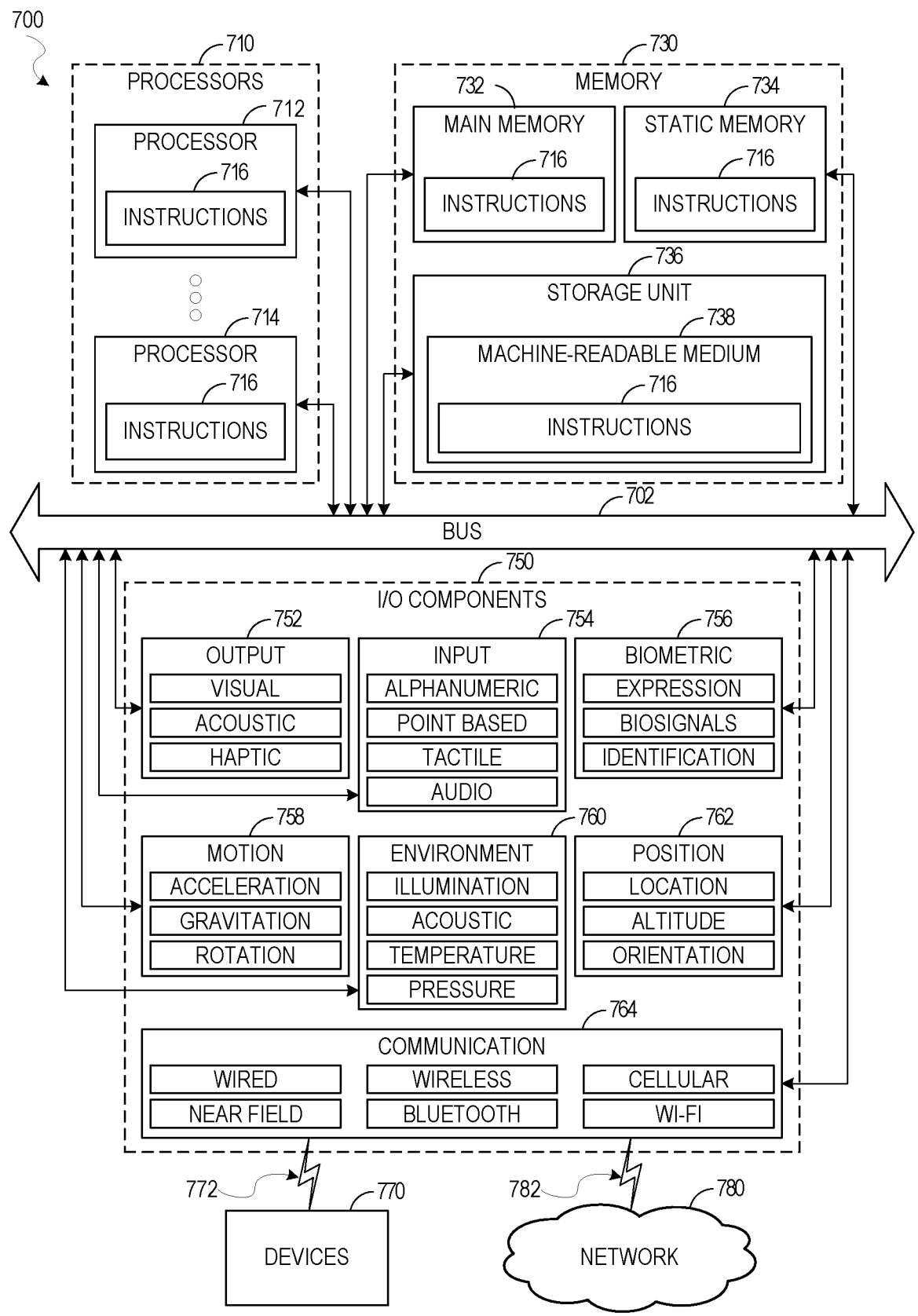
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the methods of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
receiving an indication regarding an application version of an application stored in a container in a container architecture;
obtaining a product version map stored as a custom resource in the container architecture, the product version map including, for each of one or more applications, a list of one or more application versions, available for provisioning and, for each of the one or more application versions, an indication of a location for an image corresponding to the application version;
retrieving an image corresponding to a selected newer version of the application using the product version map; and
upgrading an application instance using the retrieved image.

2. The system of claim 1, wherein the operations further comprise:
collecting provisioning parameters for the selected newer version; and
upgrading the application instance by provisioning the selected newer version using the provisioning parameters.

3. The system of claim 2, wherein the provisioning parameters include memory size.

4. The system of claim 1, wherein the operations further comprise presenting newer application versions of the application that have a same or higher maturity level than a maturity level of the application version of the application.

5. The system of claim 4, wherein the maturity level indicates a level of testing performed on a corresponding application instance version.

6. The system of claim 1, wherein the container architecture is a virtualization used by operating systems to deploy and run distributed applications without launching an entire virtual machine for each application.

7. The system of claim 1, wherein the operations further comprise:
detecting that an application version associated with the retrieved image is unreliable; and
in response to the detecting, deleting the application version from the product version map.

8. The system of claim 7, wherein the detecting is performed using a machine learned model trained by a machine learning algorithm using training data, to output a score indicative of reliability of an application version.

9. A method comprising:
receiving an indication regarding an application version of an application stored in a container in a container architecture;
obtaining a product version map stored as a custom resource in the container architecture, the product version map including, for each of one or more applications, a list of one or more application versions, available for provisioning and, for each of the one or more application versions, an indication of a location for an image corresponding to the application version;
retrieving an image corresponding to a selected newer version of the application using the product version map; and
upgrading an application instance using the retrieved image.

10. The method of claim 9, further comprising:
collecting provisioning parameters for the selected newer version; and
upgrading the application instance by provisioning the selected newer version using the provisioning parameters.

11. The method of claim 10, wherein the provisioning parameters include memory size.

12. The method of claim 9, further comprising presenting newer application versions of the application that have a same or higher maturity level than a maturity level of the application version of the application.

13. The method of claim 12, wherein the maturity level indicates a level of testing performed on a corresponding application instance version.

14. The method of claim 9, wherein the container architecture is a virtualization used by operating systems to deploy and run distributed applications without launching an entire virtual machine for each application.

15. The method of claim 9, further comprising:
detecting that an application version associated with the retrieved image is unreliable; and
in response to the detecting, deleting the application version from the product version map.

16. The method of claim 15, wherein the detecting is performed using a machine learned model trained by a machine learning algorithm using training data, to output a score indicative of reliability of an application version.

17. A non-transitory machine-readable medium storing instructions which, when executed by one or more processors, cause the one or more processors to perform operations comprising:
receiving an indication regarding an application version of an application stored in a container in a container architecture;
obtaining a product version map stored as a custom resource in the container architecture, the product version map including, for each of one or more applications, a list of one or more application versions, available for provisioning and, for each of the one or more application versions, an indication of a location for an image corresponding to the application version;
retrieving an image corresponding to a selected newer version of the application using the product version map; and
upgrading an application instance using the retrieved image.

18. The non-transitory machine-readable medium of claim 17, wherein the operations further comprise:
collecting provisioning parameters for the selected newer version; and
upgrading the application instance by provisioning the selected newer version using the provisioning parameters.

19. The non-transitory machine-readable medium of claim 18, wherein the provisioning parameters include memory size.

20. The non-transitory machine-readable medium of claim 17, wherein the operations further comprise presenting newer application versions of the application that have a same or higher maturity level than a maturity level of the application version of the application.

* * * * *